United States Patent
Huang et al.

(10) Patent No.: US 12,152,123 B2
(45) Date of Patent: Nov. 26, 2024

(54) FOAMABLE COMPOSITION CONTAINING RECOVERED SILICON SLUDGE, FOAMED MATERIAL PREPARED THEREFROM AND COMPOSITE PRODUCT INCLUDING THE SAME

(71) Applicant: NAM LIONG GLOBAL CORPORATION, Taipei (TW)

(72) Inventors: Ting-Sheng Huang, Tainan (TW); June-Sheng Lee, Tainan (TW); Po-Han Shi, Tainan (TW); Ching-Hui Lee, Tainan (TW)

(73) Assignee: NAM LIONG GLOBAL CORPORATION, Taipei (TW)

( * ) Notice: Subject to any disclaimer, the term of this patent is extended or adjusted under 35 U.S.C. 154(b) by 84 days.

(21) Appl. No.: 17/806,950

(22) Filed: Jun. 15, 2022

(65) Prior Publication Data

US 2022/0403141 A1   Dec. 22, 2022

(30) Foreign Application Priority Data

Jun. 17, 2021   (TW) .................................. 110122149

(51) Int. Cl.
| | | |
|---|---|---|
| C08J 5/24 | (2006.01) | |
| C08J 9/00 | (2006.01) | |
| C08J 9/10 | (2006.01) | |
| C08J 9/236 | (2006.01) | |
| C08J 9/36 | (2006.01) | |
| C08K 5/00 | (2006.01) | |
| C08K 11/00 | (2006.01) | |

(52) U.S. Cl.
CPC ............. C08K 11/005 (2013.01); C08J 5/249 (2021.05); C08J 9/236 (2013.01); C08J 9/365 (2013.01); C08K 5/0025 (2013.01)

(58) Field of Classification Search
CPC .................................................... C08J 2311/00
See application file for complete search history.

(56) References Cited

FOREIGN PATENT DOCUMENTS

| | | | | |
|---|---|---|---|---|
| CN | 104877262 A | * | 9/2015 | |
| CN | 105859212 A | | 8/2016 | |
| CN | 108384250 A | * | 8/2018 | ............. C08J 9/103 |
| CN | 112552562 A | * | 3/2021 | |
| JP | 2000080280 A | * | 3/2000 | |

OTHER PUBLICATIONS

Machine translation of CN-112552562-A obtained from the European Patent Office website in Nov. 2023 (Year: 2023).*
Machine translation of CN-108384250-A obtained from the European Patent Office website in Nov. 2023 (Year: 2023).*
Machine translation of CN-104877262-A obtained from the European Patent Office website in Nov. 2023 (Year: 2023).*
Machine translation of JP-2000080280-A obtained from the European Patent Office website in Apr. 2024.*
Search Report dated Dec. 14, 2021 from Taiwanese Application No. 110122149, with an English translation thereof.

* cited by examiner

*Primary Examiner* — Melissa A Rioja
(74) *Attorney, Agent, or Firm* — MH2 Technology Law Group, LLP

(57) ABSTRACT

Disclosed herein is a foamable composition including a polymer component, a foaming agent, a crosslinking agent, a filler, and a recovered silicon sludge containing silicon carbide and silicon. The polymer component is present in an amount ranging from 15 wt % to 60 wt % based on a total weight of the foamable composition. A foamed material prepared from the foamable composition and a composite product including the same are also disclosed.

12 Claims, No Drawings

FOAMABLE COMPOSITION CONTAINING RECOVERED SILICON SLUDGE, FOAMED MATERIAL PREPARED THEREFROM AND COMPOSITE PRODUCT INCLUDING THE SAME

CROSS-REFERENCE TO RELATED APPLICATION

This application claims priority of Taiwanese Invention Patent Application No. 110122149, filed on Jun. 17, 2021.

FIELD

The present disclosure relates to a foamable composition, and more particularly to a foamable composition containing a recovered silicon sludge. The present disclosure also relates to a foamed material prepared from the foamable composition and a composite product including the foamed material.

BACKGROUND

Silicon wafers used in a conventional semiconductor manufacturing process are obtained by cutting silicon ingots, and a considerable amount of waste silicon sludge is generated during the cutting process. Since silicon wafers are widely applied in various fields, the amount of waste silicon sludge increases continuously, resulting in a negative impact to the environment which cannot be disregarded. Currently, the waste silicon sludge is generally disposed by burial or incineration. However, incineration of the waste silicon sludge causes air pollution, while burial of the waste silicon sludge incurs various problems such as high cost of lands for burial, difficulties of finding such lands, and environmental pollution. Thus, there is an urgent need to effectively reuse the waste silicon sludge so as to solve the aforesaid problems and to increase the economic value of the waste silicon sludge.

SUMMARY

Therefore, an object of the present disclosure is to provide a foamable composition that can alleviate at least one of the drawbacks of the prior art.

According to the present disclosure, the foamable composition includes a polymer component, a foaming agent, a crosslinking agent, a filler, and a recovered silicon sludge containing silicon carbide and silicon. The polymer component is present in an amount ranging from 15 wt % to 60 wt % based on a total weight of the foamable composition.

Another object of the present disclosure is to provide a foamed material that can alleviate at least one of the drawbacks of the prior art.

According to the present disclosure, the foamed material is prepared by subjecting the foamable composition to a foam molding procedure.

Still another object of the present disclosure is to provide a composite product that can alleviate at least one of the drawbacks of the prior art.

According to the present disclosure, the composite product includes the foamed material, and a first functional layer which is superimposed on the foamed material. The first functional layer is a fabric layer or a coating layer.

DETAILED DESCRIPTION

The foamable composition, the foamed material and the composite product of the present disclosure are described in detail as follows.

<Foamable Composition>

The foamable composition includes a polymer component, a foaming agent, a crosslinking agent, a filler, and a recovered silicon sludge containing silicon carbide and silicon. The polymer component is present in an amount ranging from 15 wt % to 60 wt % based on a total weight of the foamable composition.

<Polymer Component>

The polymer component includes at least one polymer. The polymer may be, for example, but not limited to, a rubber, a plastic, a thermosetting elastomer or a thermoplastic elastomer. The rubber may be, for example, natural rubber, deproteinized natural rubber, etc. The plastic may be, for example, polyethylene. The thermosetting elastomer may be, for example, chloroprene rubber, styrene butadiene rubber, EPDM rubber, polybutadiene rubber, or nitrile rubber. The thermoplastic elastomer may be, for example, ethylene vinyl acetate copolymer, etc.

In some embodiments, the polymer component is present in an amount ranging from 25 wt % to 60 wt % based on the total weight of the foamable composition.

<Foaming Agent>

A single type of foaming agent may be used, or multiple types of foaming agents may be mixed for use. The foaming agent may be, for example, but not limited to, an organic foaming agent or an inorganic foaming agent. The organic foaming agent may be, for example, but not limited to, an organic foaming agent capable of producing nitrogen, which may be, for example, an azodicarbonamide. The inorganic foaming agent may be, for example, an inorganic foaming agent capable of generating carbon dioxide gas, which may be, for example, sodium bicarbonate.

In order to allow the foamed material prepared from the foamable composition to have a better foaming density, in certain embodiments, the foaming agent is present in an amount ranging from 1 wt % to 10 wt % based on the total weight of the foamable composition. In some embodiments, the foaming agent is present in an amount ranging from 1 wt % to 4 wt % based on the total weight of the foamable composition.

<Crosslinking Agent>

A single type of crosslinking agent may be used, or multiple types of crosslinking agents may be mixed for use. The crosslinking agent may be, for example, sulfur, peroxide, metal oxide, etc. The peroxide may be, for example, bis(tert-butylperoxyisopropyl)benzene (BIBP), etc. The metal oxide may be, for example, zinc oxide (ZnO), magnesium oxide (MgO), etc. In some embodiments, the crosslinking agent is present in an amount ranging from 0.1 wt % to 5 wt % based on the total weight of the foamable composition.

<Filler>

A single type of filler may be used alone, or multiple types of fillers may be mixed for use. The filler may be, for example, but not limited to, calcium carbonate, clay, and kaolin clay. Calcium carbonate may be obtained, for example, from shell powder of marine organisms or from natural minerals (e.g., chalk). The clay may be obtained, for example, from natural minerals (e.g., kaolinite or montmorillonite). The kaolin clay may be those obtained, for example, by processing the clay. The shell powder of marine organisms may be, example, oyster shell powder, mussel shell powder, clam shell powder or other edible snail shell powder. The filler includes particles that can pass through a 250 mesh. The amount of the filler that can pass through the 250 mesh is in a range of 50 wt % or more, based on a total amount of 100 wt % of the filler. The filler is present in an amount ranging from 5 wt % to 60 wt % based on the total weight of the foamable composition. In some embodiments, the filler is present in an amount ranging from 10 wt % to 50 wt % based on the total weight of the foamable composition.
<Recovered Silicon Sludge>

In certain embodiments, the recovered silicon sludge is present in an amount ranging from 0.5 wt % to 50 wt % based on the total weight of the foamable composition. In some embodiments, the recovered silicon sludge is present in an amount ranging from 0.5 wt % to 25 wt % based on the total weight of the foamable composition. In some embodiments, silicon carbide is present in an amount ranging from 50 wt % to 98 wt % based on the total weight of the recovered silicon sludge.

The average particle size of particles contained the recovered silicon sludge is not more than 250 mesh. The recovered silicon sludge may be obtained, for example, by recovering the sludge produced from a silicon wafer-cutting procedure in a semiconductor process or a solar energy process and then removing the cutting oil from the recovered sludge.

It should be noted that, in certain embodiments, part of the filler or the reinforcing agent described hereinafter may be obtained from natural resources (e.g., natural minerals). Since the recovered silicon sludge has functions and properties similar to the filler or the reinforcing agent, the recovered silicon sludge can be used as a substitute for the filler or the reinforcing agent to regulate usage thereof, thereby reducing the exploitation of natural resources and avoiding environmental damages caused by mining.
<Softener>

In order to promote the processing properties (e.g. flowability) of the foamable composition of the present disclosure, in some embodiments, the foamable composition may also include a softener. A single type of softener may be used, or multiple types of softeners may be mixed for use. The softener may be, for example, but not limited to, a plant oil-based softener or a petroleum-based softener. The petroleum-based softener may be, for example, a paraffin-based oil, an aromatic-based oil or a cycloalkyl oil. To achieve an appropriate viscosity of the foamable composition, in certain embodiments, the softener is present in an amount ranging from 5 wt % to 20 wt % based on the total weight of the foamable composition.
<Reinforcing Agent>

In order to obtain a foamed material of the present disclosure Which has an appropriate mechanical properties (e.g. tensile strength or tear strength), in some embodiments, the foamable composition further includes a reinforcing agent. A single type of reinforcing agent may be used, or multiple types of reinforcing agents may be mixed for use. The reinforcing agent may be, for example, but not limited to, an organic reinforcing agent or an inorganic reinforcing agent. The organic reinforcement may be, for example, styrene butadiene rubber with high styrene content, etc. The inorganic reinforcing agent may be, for example, carbon black, etc. The carbon black may be, for example, thermal black, acetylene black or furnace black, etc. In certain embodiments, the reinforcing agent is present in an amount ranging from 2 wt % to 30 wt % based on the total weight of the foamable composition. In some embodiments, the reinforcing agent is present in an amount ranging from 2 wt % to 10 wt % based on the total weight of the foamable composition.
<Functional Additive>

The foamable composition may further include a functional additive different from the aforesaid components depending on the desired properties of the foamable composition (e.g., dispersibility or reactivity, etc.) and the desired properties of the foamed material. A single type of functional additive may be used, or multiple types of functional additives may be mixed for use.

The functional additive may be, for example, but not limited to, a crosslinking auxiliary, a foaming auxiliary, a vulcanization promoter, an aging inhibitor, a retardant, an antioxidant, an auxiliary dispersant, or a dispersing agent. In some embodiments, the foaming auxiliary may be, for example, polyethylene glycol (PEG) or diethylene glycol (DEG), etc. The vulcanization promoter may be, for example, N,N'-diethylthiourea (DETU), 2-mercaptobenzothiazole(MBT), dibenzothiazyl disulfide (METS), zinc oxide (ZnO), etc. The aging inhibitor may be, for example, waxes, etc. The dispersion auxiliary may be, for example, stearic acid, etc. The waxes may be, for example, white wax, microcrystalline wax, etc. In certain embodiments, the functional additive is present in an amount ranging from 1.5 wt % to 20 wt % based on the total weight of the foamable composition. In some embodiments, the functional additive is present in an amount ranging from 1.5 wt % to 6 wt % based on the total weight of the foamable composition.

In some embodiments, the polymer component, the foaming agent, the crosslinking agent, the filler, and the recovered silicon sludge are mixed using a mixing apparatus to prepare the foamable composition. The mixing apparatus may be, for example, a Leena machine or a double-roller machine. Further, at least one of the softener, the reinforcing agent and the functional additive may be added during mixing depending on the desired properties of the foamable composition.
<Foamed Material>

The foamed material is prepared by subjecting the foamable composition to a foam molding process. In some embodiments, the foamed material is prepared by molding the foamable composition into a sheet, and then foam molding the sheet to obtain the foamed material. In some embodiments, the forming procedure is carried out using an extruder. In some embodiments, the foam molding process is carried out in a thermoforming apparatus. The thermoforming apparatus may be, for example, a vulcanization molding machine or a compression foam molding machine. In some embodiments, the foamed material has a density ranging from 0.01 g/cm$^3$ to 0.70 g/cm$^3$. In some embodiments, the foamed material may be in a plate shape.

The foamed material can be applied to diving suits, surfing suits, fishing pants, knee pads, wrist guards, bags, padding, conveyor belts, various industrial gaskets, etc.
<Composite Product>

The composite product of the present disclosure includes the foamed material and a first functional layer which is superimposed on the foamed material. The first functional layer s a fabric layer or a coating layer.

When the first functional layer is a fabric layer, the fabric layer can be used to impart desired tensile strength and tear strength to the composite product, and to change the appearance of the composite product. The fabric layer may be made of, for example, but not limited to, a textile fabric or a synthetic leather. The textile fabric may be made of, for example, nylon, polyester, cotton or linen. The synthetic leather may be made of, for example, polyurethane.

When the first functional layer is a coating layer, the coating layer can be used to impart desired tensile strength, abrasion resistance or surface smoothness to the composite product, and can change the appearance of the composite product. The coating layer may be, for example, but not limited to, a polyurethane layer.

The composite product further includes a second functional layer disposed on the foamed material opposite to the first functional layer. The second functional layer is a fabric layer or a coating layer.

When the second functional layer is a fabric layer, the fabric layer can be used to impart desired tensile strength and tear strength to the composite product, and to change the appearance of the composite product. The fabric layer may be made of, for example, but not limited to, a textile fabric or a synthetic leather. The textile fabric may be made of, for example, nylon, polyester, cotton or linen. The synthetic leather may be made of, for example, polyurethane.

When the second functional layer is a coating layer, the coating layer can be used to impart desired tensile strength, abrasion resistance or surface smoothness to the composite product, and can change the appearance of the composite product. The coating layer may be, for example, but not limited to, a polyurethane layer.

Examples of the present disclosure will be further described below. It should be understood, however, that the Examples described are for illustrative purposes only and should not be construed as limiting the implementation of the present disclosure.

EXAMPLE 1

30 wt % of chloroprene rubber placed in a double-roller machine (Manufacturer: Yi Tzung Precision Machinery Corp.; Model: ML1-2-1) was compounded, and then was fed into a Leena machine (Manufacturer: Kneader Machinery Co., Ltd.; Model: KD-3-7.5).

Subsequently, the following components were added into the Leena machine to be compounded so as to obtain a foamable composition containing a recovered silicon sludge: 3 wt % of azodicarbonamide (as a foaming agent), 4 wt % of ZnO (as a crosslinking agent), 20 wt % of cycloalkyl oil (as a softener; Brand: Sunoco; Model: N-15), 5 wt % of carbon black (as a reinforcing agent), 10 wt % of calcium carbonate (as a filler), 24 wt % of kaolin clay (as another filler; Brand: Champion; Model: Champion Clay), 0.5 wt % of N,N'-diethylthiourea (as vulcanization promoter), 1.5 wt % of polyethylene glycol (as an auxiliary foaming agent), 1.0 wt % of refined compound microcrystalline wax (as an aging inhibitor; brand: SER; Model: CERA SER AO54), and 1 wt % of recovered silicon sludge, which includes 83 wt % of silicon carbide, 10 wt % of silicon and 7 wt % of other component(s) based on a total weight of the recovered silicon sludge.

Then, the foamable composition containing the recovered silicon sludge was extruded by an extruder to form a sheet with a dimension of 10 cm in length, 10 cm in width and 1 cm in thickness. Finally, the sheet was vulcanized and molded in a vulcanizing machine (purchased from Han Chang Machinery Industrial Co., Ltd.; Model: HC-G70) to obtain a foamed material.

EXAMPLES 2 TO 4 AND COMPARATIVE EXAMPLE 1

The foamed materials of Examples 2 to 4 and Comparative Example 1 were prepared using procedures similar to those of Example 1, except that the amounts of some components in the foamable compositions of Examples 2 to 4 and Comparative Example 1 were changed, as shown in Table 1 below.

EXAMPLE 5 AND COMPARATIVE EXAMPLE 2

The foamed materials of Example 5 and Comparative Example 2 were prepared using procedures similar to those of Example 1, except that chloroprene butadiene rubber and styrene butadiene rubber were used as the polymer component, and the types and amounts of some components in the foamable composition were changed, as shown in Table 2 below. Specifically, Naphthenic process oil (Brand: Sunoco: Model: N-15) was used as a softener, diethylene glycol was used as a foaming 2-hydrothiobenzothiazole and dibenzothiazyl disulfide were used as vulcanization promoters, and refined compound microcrystalline wax was used as a functional additive, i.e., an aging inhibitor (Brand: SER; Model: CERA SER AO54).

EXAMPLE 6 AND COMPARATIVE EXAMPLE 3

The foamed materials of Example 6 and Comparative Example 3 were prepared using procedures similar to those of Example 1, except that ethylene/vinyl acetate copolymer and polyethylene were used as the polymer component, and the types and amounts of some components in the foamable composition were changed, as shown in Table 3 below. Specifically, Oyster shell powder was used as a filler, zinc oxide was used as a vulcanization enhancer, and stearic acid was used as a functional additive, i.e., auxiliary dispersant.

Property Evaluation (1) Mooney Viscosity:
Foamable compositions of Examples 1 to 5 and Comparative Examples 1 to were subjected to viscosity measurement in accordance with ASTM D1646 (2019 edition) using a Mooney viscometer under a preheating time of 1 minute, a rotation time of 4 minutes, and a temperature of 100° C.
(2) Tear Strength:
The foamed materials of Examples 1 to 6 and Comparative Examples 1 to 3 were subjected to tear strength measurement according to ASTM D624 (2000 edition) using a tensile testing machine.
(3) Elongation at Break and Tensile Strength:
Each of the foamed materials of Examples 1 to 6 and Comparative Examples to 3 was made into a dumbbell-shaped test sample. The test samples were subjected to measurement of elongation at break and tensile strength in accordance with ASTM D412 (2016 edition) using a tensile tester. The speed of movement was set to 500±150 mm/min during measurement.
(4) Thermal Shrinkage Rate:
Each of the foamed materials of Examples 1 to 6 and Comparative Examples 1 to 3 was prepared as a test sample, and then the test samples were heated according to JIS K6767 (1999 edition) using a hot air circulating oven. The dimensions of the test samples before and after heating were measured, and the thermal shrinkage rates of the test samples were calculated. The measurement temperature and time were set to 70±2° C. and 22 hours, respectively.
(5) Hardness:
The hardness of each of the foamed materials of Examples 1 to 6 and Comparative Examples 1 to 3 was measured according to JIS S6050 (2002 edition) using a hardness tester (Model: ASKER. TYPE C).
(6) Density:
The density of each of the foamed materials of Examples 1 to 6 and Comparative Examples 1 to 3 was measured according to ASTM D1817 (2005 edition) using a specific gravity balance instrument.
(7) Compression Deformation Rate:
The foamed materials of Examples 1 to 6 and Comparative Examples 1 to 3 were compressed using a rubber compression deformer according to ASTM D395 (2016 edition). The dimensions of the foamed materials before and after compression were measured, and then the compression deformation rate was calculated under a compression rate or 50%, a temperature of 25° C., and time period of 22 hours.

It should be noted that the abbreviations "Ex." and "C. Ex." in the following Tables 1 to 3 refers to Example and Comparative Example, respectively.

TABLE 1

| Components of foamable composition (wt %) | | Ex. 1 | Ex. 2 | Ex. 3 | Ex. 4 | C. Ex. 1 |
|---|---|---|---|---|---|---|
| Polymer component | Chloroprene rubber | 30 | 30 | 30 | 30 | 30 |
| Foaming agent | Azodicarbonamide | 3 | 3 | 3 | 3 | 3 |
| Crosslinking agent | ZnO | 4 | 4 | 4 | 4 | 4 |
| Softner | Cycloalkyl oil | 20 | 20 | 20 | 20 | 20 |
| Reinforcing agent | Carbon black | 5 | 5 | 5 | 5 | 5 |
| Filler | Calcium carbonate | 10 | 10 | 10 | 10 | 10 |
| | Kaolin clay | 24 | 20 | 15 | 0 | 25 |
| Functional additive | N,N'-diethylthiourea | 0.5 | 0.5 | 0.5 | 0.5 | 0.5 |
| | Polyethylene glycol | 1.5 | 1.5 | 1.5 | 1.5 | 1.5 |
| | Refined compound microcrystalline wax | 1 | 1 | 1 | 1 | 1 |
| Recovered silicon sludge | | 1 | 5 | 10 | 25 | 0 |
| Property evaluation | Mooney Viscosity ML (1 + 4) 100° C. | 12.43 | 14.18 | 15.2 | 15.54 | 12.28 |
| | Tensile strength (kg/cm$^2$) | 5.2 | 5.3 | 6.1 | 6.4 | 4.8 |
| | Tear strength (kg/cm) | 1.7 | 2.2 | 2.3 | 2.4 | 1.6 |
| | Elongation at break (%) | 445 | 468 | 487 | 490 | 430 |
| | Thermal shrinkage rate (%) | 3.1 | 2.8 | 2.7 | 2.4 | 3.5 |
| | Hardness (SHORE 000 ± 0.5) | 56.5 | 58.5 | 60.5 | 62.5 | 55.5 |
| | Density (g/cm$^3$) | 0.163 | 0.168 | 0.172 | 0.182 | 0.162 |
| | Compression deformation rate (%) | 18.8 | 17.5 | 12.4 | 11.4 | 20.1 |

Referring to the experimental data in Table 1, compared with Comparative Example 1, under the same total amount (35 wt %) of the filler and the recovered silicon sludge, the recovered silicon sludge can be used to replace a portion of the kaolin clay, as shown in Examples 1 to 4, and thus the amount of the filler derived from natural resources can be reduced. Furthermore, compared to the foamed material prepared from the foamable composition without the recovered silicon sludge, the foamed material prepared from the foamable composition containing the recovered silicon sludge of the present disclosure has high tensile strength, high tear strength, high elongation at break, low heat shrinkage rate, and low compression deformation rate. These results show that the recovered silicon sludge can impart excellent mechanical strength to the foamed material. Therefore, the recovered silicon sludge can indeed be applied in various fields related to foamed materials.

TABLE 2

| Components of foamable composition (wt %) | | Ex. 5 | C. Ex. 2 |
|---|---|---|---|
| Polymer component | Chloroprene rubber | 5 | 5 |
| | Styrene butadiene rubber | 20 | 20 |
| Foaming agent | Azodicarbonamide | 4 | 4 |
| Crosslinking agent | Sulfur | 0.5 | 0.5 |
| Softner | Cycloalkyl oil | 6 | 6 |
| Reinforcing agent | Carbon black | 4 | 4 |
| Filler | Calcium carbonate | 50 | 55 |
| Functional additive | Diethylene glycol | 2.7 | 2.7 |
| | 2-mercaptobenzothiazole | 0.5 | 0.5 |
| | Dibenzothiazyl disulfide | 0.8 | 0.8 |
| | Refined compound microcrystalline wax | 1.5 | 1.5 |
| Recovered silicon sludge | | 5 | 0 |
| Property evaluation | Mooney Viscosity ML (1 + 4) 100° C. | 21.0 | 19.9 |
| | Tensile strength (kg/cm$^2$) | 5.9 | 5.2 |
| | Tear strength (kg/cm) | 1.5 | 1.1 |
| | Elongation at break (%) | 242 | 239 |
| | Thermal shrinkage rate (%) | 3.4 | 3.8 |
| | Hardness (SHORE 000 ± 0.5) | 7.5 | 5.5 |
| | Density (g/cm$^3$) | 0.244 | 0.212 |
| | Compression deformation rate (%) | 19.2 | 21.8 |

Referring to the experimental data in Table 2, compared with Comparative Example 2, under the same total amount (55 wt %) of the filler and the recovered silicon sludge, the recovered silicon sludge can be used to replace a portion of calcium carbonate, as shown in Example 5, and thus the amount of the filler derived from natural resources can be reduced. Furthermore, compared with the foamed material prepared from the foamable composition without the recovered silicon sludge, the foamed material prepared from the foamable composition containing the recovered silicon sludge of the present disclosure has high tensile strength, high tear strength, high elongation at break, low heat shrinkage rate, and low compression deformation rate. These result show that the recovered silicon sludge can impart excellent mechanical strength to the foamed material. Therefore, the recovered silicon sludge can indeed be applied in various fields related to foamed materials.

TABLE 3

| Components of foamable composition (wt %) | | Ex. 6 | C. Ex. 3 |
|---|---|---|---|
| Polymer component | Ethylene vinyl acetate copolymer | 34 | 34 |
| | Polyethylene | 22 | 22 |
| Foaming agent | Azodicarbonamide | 2.7 | 2.7 |
| Crosslinking agent | Bis (tert-butylperoxy-isopropyl) benzene | 0.3 | 0.3 |
| Filler | Calcium carbonate | 17 | 22 |
| | Oyster shell powder | 17.5 | 17.5 |
| Functional additive | ZnO | 1 | 1 |
| | Stearic acid | 0.5 | 0.5 |
| Recovered silicon sludge | | 0 | 0 |
| Property evaluation | Tensile strength (kg/cm$^2$) | 14.9 | 10.5 |
| | Tear strength (kg/cm) | 5.2 | 3.6 |
| | Elongation at break (%) | 183 | 171 |
| | Thermal shrinkage rate (%) | 2.04 | 2.20 |
| | Hardness (SHORE 000 ± 0.5) | 77 | 34.5 |
| | Density (g/cm$^3$) | 0.143 | 0.120 |
| | Compression deformation rate (%) | 38.5 | 44.5 |

Referring to the experimental data in Table 3, compared with Comparative Example 3, under the same total amount (39.5 wt %) of the filler and the recovered silicon sludge, the recovered silicon sludge can be used to replace a portion of calcium carbonate, as shown in Example 6, and thus the amount of the filler derived from natural resources can be reduced. Furthermore, compared with the foamed material prepared from the foamable composition without the recovered silicon sludge, the foamed material prepared from the foamable composition containing the recovered silicon sludge of the present disclosure has high tensile strength, high tear strength, high elongation at break, low heat shrinkage rate, and low compression deformation rate. These results show that the recovered silicon sludge can impart excellent mechanical strength to the foamed material. Therefore, the recovered silicon sludge can indeed be applied in various fields related to foamed materials.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the present disclosure has been described in connection with what is considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A foamable composition containing a recovered silicon sludge, comprising:
   a polymer component;
   a foaming agent;
   a crosslinking agent;
   a filler; and
   a recovered silicon sludge containing silicon carbide and silicon,
   wherein said polymer component is present in an amount ranging from 15 to 60 wt % based on a total weight of said foamable composition.

2. The foamable composition according to claim 1, wherein said recovered silicon sludge is present in an amount ranging from 0.5 wt % 50 wt % based on the total weight of said foamable composition.

3. The foamable composition according to claim 1, wherein said foaming agent is present in an amount ranging from 1 wt % to 10 wt % based on the total weight of said foamable composition.

4. The foamable composition according to claim 1 wherein said crosslinking agent is present in an amount ranging from 0.1 wt % to 5 wt % based on the total weight of said foamable composition.

5. The foamable composition according to claim 1, further comprising a softener which is present in an amount ranging from 5 wt % to 20 wt % based on the total weight of said foamable composition.

6. The foamable composition according to claim 1, further comprising a reinforcing agent which is present in an amount ranging from 2 wt % to 30 wt % based on the total weight of said foamable composition.

7. The foamable composition according to claim 1, wherein said filler is present in an amount ranging from 5 wt % to 60 wt % based on the total weight of said foamable composition.

8. The foamable composition according to claim 1, further comprising a functional additive which is present in an amount ranging from 1.5 wt % to 20 wt % based on the total weight of said foamable composition.

9. A foamed material prepared by subjecting said foamable composition according to claim 1 to a foam molding procedure.

10. The foamed material according to claim 9, which is in a plate shape.

11. A composite product, comprising said foamed material according to claim 9, and a first functional layer which is superimposed on said foamed material, wherein said first functional layer is a fabric layer or a coating layer.

12. The composite product according to claim 11, further comprising a second functional layer disposed on said foamed material opposite to said first functional layer, wherein said second functional layer is a fabric layer or a coating layer.

\* \* \* \* \*